J. C. WANDS.
SIDE BEARING FOR RAILWAY CARS.
No. 11,611. Reissued June 15, 1897.
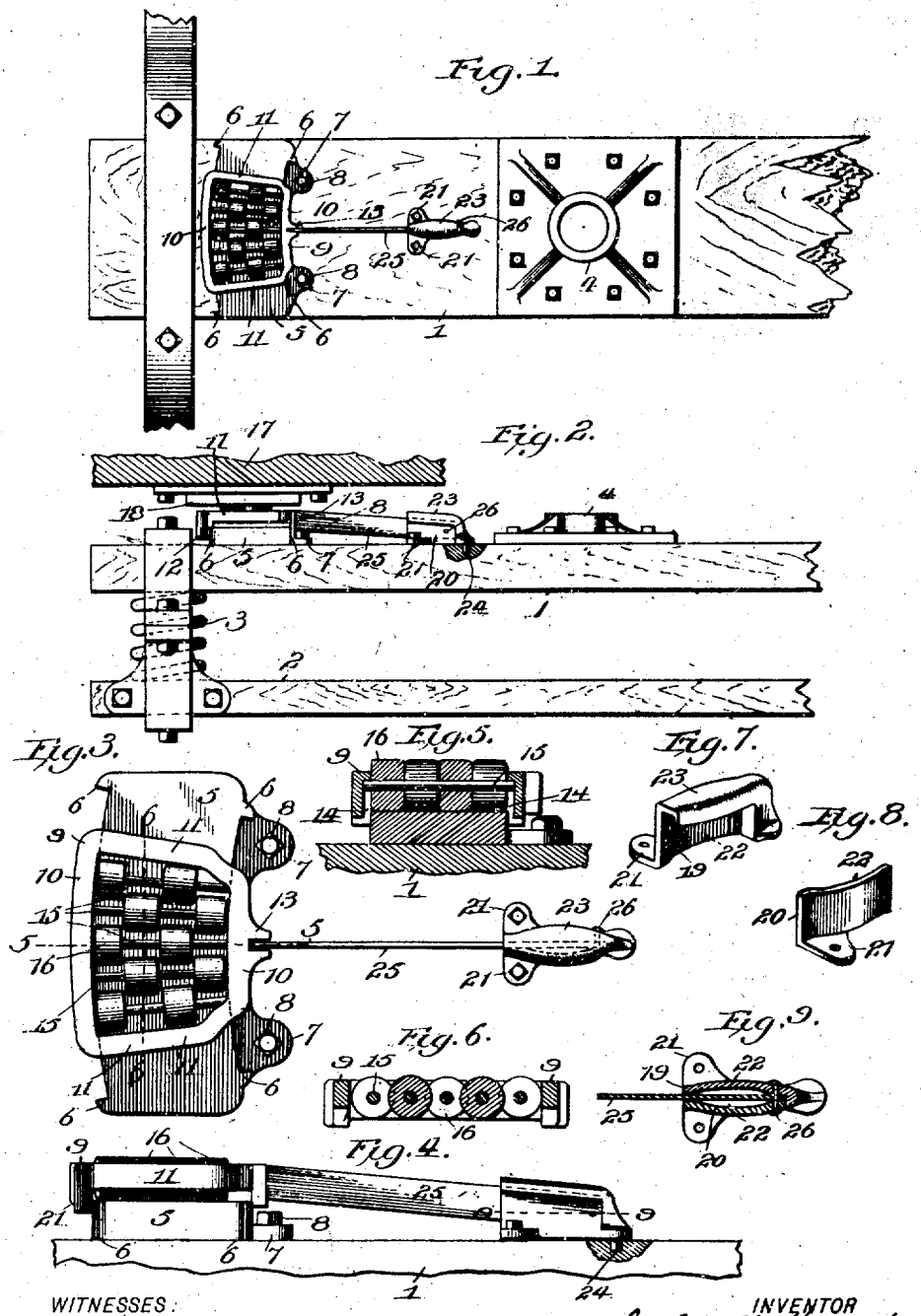
WITNESSES:
Harry S. Arthur
Wm. E. Dyer
INVENTOR
John C. Wands
BY F. W. Ritter Jr.
ATTORNEY.

UNITED STATES PATENT OFFICE.

JOHN C. WANDS, OF ST. LOUIS, MISSOURI.

SIDE BEARING FOR RAILWAY-CARS.

SPECIFICATION forming part of Reissued Letters Patent No. 11,611, dated June 15, 1897.

Original No. 533,763, dated February 5, 1895. Application for reissue filed December 31, 1896. Serial No. 617,683.

*To all whom it may concern:*

Be it known that I, JOHN C. WANDS, of the city of St. Louis, State of Missouri, have invented certain new and useful Improvements in Side Bearings for Railway-Cars, of which the following is a full, clear, and exact description, reference being had to the accompanying drawings, forming a part hereof.

My invention relates to antifriction side bearings for railway-cars, the object of my invention being to provide means that will present a larger bearing-surface than any of the devices now in use without cutting, sawing, or altering the bolster or transom in the present construction.

My invention consists in a series or nest of antifriction-rollers carried by a roller-frame and operating directly upon the bearing-plate that is bolted to the top bolster, and various other novel features of construction, combination, and arrangement of parts hereinafter described and claimed.

In the drawings, Figure 1 is a top plan view of the top bolster of a car-truck, the same showing my invention applied thereto. Fig. 2 is a side elevation of the bolsters of a car-truck, also a portion of the transom that is fixed to the under side of the car-body, and my improvement interposed between said transom and the top bolster. Fig. 3 is a top plan view of my complete invention. Fig. 4 is a side elevation thereof. Fig. 5 is a cross-sectional view on the indicated line 5 5 of Fig. 3. Fig. 6 is a cross-sectional view taken approximately on the indicated line 6 6 of Fig. 3. Figs. 7 and 8 are perspective views of the mating portions of a clamp of which I make use in carrying out my invention. Fig. 9 is a longitudinal sectional view taken approximately on the indicated line 9 9 of Fig. 4.

Referring by numerals to the accompanying drawings, 1 indicates the top bolster of a car-truck, and 2 the lower bolster, the same being of the ordinary construction and having a coil-spring 3 interposed between their ends. Securely bolted to the center and on top of the top bolster is the center bearing 4 of the usual form. The side bearings, as contemplated by my invention, occupy positions on the top surface of the top bolster 1 and adjacent the ends thereof. As these side bearings are counterparts, but one will be described.

The segmental base-plate 5 has formed on both sides and near the tops thereof stops 6, the purpose of which will be presently shown. Formed integral with the lower portion of the base-plate are lugs 7, through which pass bolts 8, thus rigidly securing said base-plates upon the top bolster. It may be here stated that the curvature of the segmental base-plate 5 is in conformity with a circle having its center in the center of the bearing 4.

A segmental roller-frame 9 is constructed with the sides 10 10 and ends 11 11, there being formed at the meeting corners of the sides 10 and ends 11 downwardly-depending lugs 12 which are adapted to strike or engage against the stops 6 on the segmental base-plate, thus restricting the movement of the segmental roller-frame. Formed integral with the front side 10 of the segmental roller-frame is a pair of ears 13, the purpose of which will be presently shown.

Formed on the inner surface of the sides 10 of the segmental roller-frame are vertical recesses 14, which are adapted to form bearings for the ends of shafts 15, that carry antifriction-rollers 16. These rollers 16 are preferably nested or so alternated and located upon the shafts 15 as that the periphery of each succeeding roller will overlap the periphery of the adjacent roller, thus increasing the roller-surface without increasing the area required for the locating and positioning of the rollers.

In Fig. 2 I have shown a portion of the transom 17, that is rigidly fixed to the under side of the car-body. To the under side of this transom 17 is bolted a bearing-plate 18, that is adapted to ride directly upon the antifriction-rollers 16, the same extending a slight distance above the segmental roller-frame.

The clamp shown in Figs. 7 and 8 comprises mating portions 19 and 20, the same being provided with integral lugs 21, by means of which said clamp is securely bolted to the top of the top bolster. The mating halves 19 and 20 of this clamp have curved or segmental sides 22, the part 19 being provided with a cap 23, that overlaps and engages against the top edge of the half 20. The rear end of the half 19 is provided with a downwardly-depending lug 24, that engages in the recess formed in the top surface of the top bolster 1. These mating halves 19 and 20, when in position, clamp and hold in a rigid position the rear end of a spring-bar 25, said spring-bar 25 being more firmly fixed between the mating halves of the clamp by a pin or rivet 26, passing through the rear end of said spring-bar 25 and the rear ends of the mating halves of the clamp. By constructing the clamp with the curved or segmental sides it will be seen how the rear end of the spring-bar 25 bears only at two points on the interior of said clamp. The forward end of this spring-bar 25 engages between the ears 13 on the segmental roller-frame 9.

In operation the spring-bar 25 allows the segmental roller-frame carrying the nested rollers 16 to move freely in either direction. Should the car in rounding a curve tilt to one side, the outside of the car-body will leave the rollers 16, and simultaneous with their release the spring will throw the segmental roller-frame 9, carrying the rollers, to the center of the truck-bolster ready to reëngage or receive the bearing-plate 18 on the under side of the transom 17 when the car rights itself upon the straight track. The advantage gained by nesting the rollers is that the centers of said rollers are brought much nearer to each other than where ordinary full-length rollers are used. In operation the rollers travel different distances, the outside roller having to travel a short distance farther than the inside roller. As each of the rollers works independently of the other they do not receive any torsional strain that would occur were solid full-length rollers used.

Thus it will be seen how I have constructed an efficient and inexpensive side bearing for railway-cars.

What I claim is—

1. In a side bearing for railway-cars, the combination with a bolster having a bolster-plate, and a transom having a suitable transom-plate, of an interposed independent roller-frame provided with a series of nested and overlapping antifriction rollers, substantially as and for the purposes specified.

2. A side bearing for railway-cars, comprising a suitable frame provided with series of short rollers arranged in concentric rows in a horizontal plane and with the rollers of adjacent rows overlapping, said frame adapted to be interposed between a truck-bolster and the transom of a car-body, substantially as and for the purposes specified.

3. In a side bearing for railway-cars, the combination with a roller-frame, of a plurality of roller-shafts each shaft having one or more rollers and said rollers arranged in concentric rows in a horizontal plane the rollers of adjacent rows overlapping; substantially as and for the purposes specified.

4. In a side bearing for railway-cars the combination with a movable antifriction device, of a resilient means for centering said device or restoring it to its normal position; substantially as and for the purposes set forth.

5. In a side bearing for railway-cars, the combination with a movable antifriction device, of a spring for centering said device or restoring it to its normal position; substantially as and for the purposes specified.

6. A side bearing for railway-cars, having antifriction-rollers, a suitable frame for said rollers, whereby they may be mounted between the top truck-bolster and the transom of the car-body and a spring for centering or bringing the rollers to their normal position, substantially as herein specified.

7. A side bearing for railway-cars, having antifriction-rollers nested or alternated, a suitable frame for said rollers, whereby they may be mounted between the top truck-bolster and the transom of the car-body and a spring for centering or bringing the rollers to their normal position, substantially as herein specified.

8. A side bearing for railway-cars comprising a segmental base-plate, a segmental roller-frame operating above said segmental base-plate, a series of nested or alternated rollers carried by the segmental roller-frame and bearing directly upon the segmental base-plate, and a spring, one end of which is interposed between two ears formed on the segmental roller-frame, the other end of which is secured in a clamp bolted to the top bolster, the tendency of said spring being to position the roller-frame and rollers at a central point on the segmental base-plate.

9. The combination, with a car-truck, of a side bearing consisting of a segmental base-plate bolted to the top truck-bolster, a bearing-plate bolted to the under side of the transom carried by the car-body, a segmental roller-frame operating between said bearing-plate and base-plate, a spring adapted to normally hold the roller-frame at a central point on the segmental base-plate, and a series of nested or alternated rollers carried by said segmental roller-frame and operating between the bearing-plate and segmental base-plate.

10. A side bearing for railway-cars, comprising a smooth flat-surfaced segmental base-plate, a segmental roller-frame operating above said segmental base-plate, a series of shafts carried by said roller-frame, antifriction-rollers centrically mounted upon said shafts and bearing directly upon the segmental base-plate, and a spring, one end of which is interposed between two ears formed on the segmental roller-frame, the other end of which is secured in a clamp bolted to the top bolster, the tendency of said spring being to position the roller-frame and rollers at a central point on the segmental base-plate.

In testimony whereof I affix my signature, in presence of two witnesses, this 22d day of December, 1896.

JOHN C. WANDS.

Witnesses:
W. S. CORNELL,
A. E. WORDEN.